(12) United States Patent
Robertson et al.

(10) Patent No.: US 11,328,623 B2
(45) Date of Patent: May 10, 2022

(54) SYSTEM AND METHOD FOR USING WEARABLE TECHNOLOGY IN MANUFACTURING AND MAINTENANCE

(71) Applicant: General Electric Company, Schenectady, NY (US)

(72) Inventors: Ted Lewis Robertson, Mason, OH (US); Eric Arthur Ilse, Maineville, OH (US); Matthew Geyman, Loveland, OH (US); Joseph J. Bischof, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 509 days.

(21) Appl. No.: 15/664,693

(22) Filed: Jul. 31, 2017

(65) Prior Publication Data

US 2019/0035305 A1    Jan. 31, 2019

(51) Int. Cl.
| | | |
|---|---|---|
| *G09B 19/24* | (2006.01) | |
| *G09B 5/06* | (2006.01) | |
| *G06F 1/16* | (2006.01) | |
| *G01L 5/00* | (2006.01) | |
| *G01L 5/24* | (2006.01) | |
| *G06F 3/01* | (2006.01) | |

(52) U.S. Cl.
CPC ............ *G09B 19/24* (2013.01); *G01L 5/0042* (2013.01); *G01L 5/24* (2013.01); *G06F 1/163* (2013.01); *G06F 3/011* (2013.01); *G09B 5/065* (2013.01)

(58) Field of Classification Search
CPC .................................. G09B 19/24; G01L 5/24
See application file for complete search history.

(56) References Cited

U.S. PATENT DOCUMENTS

| | | | |
|---|---|---|---|
| 6,574,672 B1 | 6/2003 | Mitchell et al. | |
| 7,805,114 B1 | 9/2010 | Quintana et al. | |
| 8,773,330 B2 | 7/2014 | Edwards et al. | |
| 9,223,494 B1 | 12/2015 | DeSalvo et al. | |
| 9,330,575 B2 | 5/2016 | Peters et al. | |
| 9,369,760 B2 | 6/2016 | Jacobsen et al. | |
| 9,611,055 B2 | 4/2017 | Subramanyam et al. | |
| 2008/0314162 A1* | 12/2008 | Inoue ..................... | G01L 5/24 73/862.23 |
| 2008/0314197 A1* | 12/2008 | Honma ................... | B25B 23/08 74/815 |
| 2008/0314204 A1* | 12/2008 | Kuboyama .............. | G01L 5/24 81/57.42 |
| 2008/0314206 A1* | 12/2008 | Akita ..................... | B23P 19/066 81/440 |
| 2009/0005910 A1* | 1/2009 | Akita ................. | G05B 19/4141 700/275 |

(Continued)

*Primary Examiner* — Robert P Bullington, Esq.
*Assistant Examiner* — Sadaruz Zaman
(74) *Attorney, Agent, or Firm* — Venable LLP; Elizabeth C. G. Gitlin; Michele V. Frank (57) ABSTRACT

An assembly system includes: a tool including a sensor; a wearable device including a display, and a computing device. The computing device is programmed to: a. provide visual instructions on the display of the device; b. monitor an input from the sensor; and c. in response to the input from the sensor: i. provide feedback to the user through the display, indicating a status of an operation of the tool; and ii. store a record of a status of an operation of the tool.

14 Claims, 5 Drawing Sheets

(56) References Cited

U.S. PATENT DOCUMENTS

| | | | | |
|---|---|---|---|---|
| 2010/0315329 | A1* | 12/2010 | Previc | G06F 3/012 345/156 |
| 2012/0122062 | A1* | 5/2012 | Yang | G09B 9/00 434/219 |
| 2012/0206335 | A1* | 8/2012 | Osterhout | G06F 3/017 345/156 |
| 2013/0189657 | A1* | 7/2013 | Wallace | G09B 5/00 434/234 |
| 2013/0196296 | A1* | 8/2013 | Peters | G09B 5/02 434/234 |
| 2014/0327762 | A1 | 11/2014 | Holzl | |
| 2014/0354529 | A1* | 12/2014 | Laughlin | G06F 3/011 345/156 |
| 2015/0309563 | A1* | 10/2015 | Connor | A61B 5/1071 73/865.4 |
| 2016/0012750 | A1* | 1/2016 | Wallace | G09B 9/00 434/234 |
| 2016/0057511 | A1* | 2/2016 | Mullins | G08C 17/00 340/870.07 |
| 2016/0130018 | A1 | 5/2016 | Subramanyam et al. | |
| 2016/0132424 | A1* | 5/2016 | Shani | G06F 30/20 714/28 |
| 2016/0171772 | A1* | 6/2016 | Ryznar | G02B 27/017 345/633 |
| 2016/0171778 | A1* | 6/2016 | Grossman | G09B 19/003 345/633 |
| 2016/0171861 | A1* | 6/2016 | Grossman | G06T 19/006 340/539.11 |
| 2016/0178466 | A1* | 6/2016 | Kaindl | G01L 5/24 73/862.21 |
| 2016/0288236 | A1* | 10/2016 | Becker | B23K 9/0953 |
| 2016/0307459 | A1* | 10/2016 | Chestnut | G06F 3/16 |
| 2016/0338644 | A1* | 11/2016 | Connor | A61B 5/11 |
| 2016/0364699 | A1* | 12/2016 | Steketee | G06Q 10/20 |
| 2017/0004827 | A1* | 1/2017 | Bancalari | G06F 1/163 |
| 2017/0042730 | A1* | 2/2017 | He | A61F 9/00736 |
| 2017/0046977 | A1* | 2/2017 | Becker | B23K 9/0953 |
| 2017/0249417 | A1* | 8/2017 | Gosieski, Jr. | G06F 1/163 |
| 2017/0300133 | A1* | 10/2017 | Morris | G04C 3/005 |
| 2017/0352282 | A1* | 12/2017 | Anderson | G09B 5/02 |
| 2018/0181810 | A1* | 6/2018 | Jhawar | G06F 3/012 |
| 2018/0237056 | A1* | 8/2018 | Bremkens | B62D 5/0463 |
| 2019/0035305 | A1* | 1/2019 | Robertson | G01L 5/0042 |
| 2020/0166990 | A1* | 5/2020 | Franzese | G06F 3/038 |

* cited by examiner

SYSTEM AND METHOD FOR USING WEARABLE TECHNOLOGY IN MANUFACTURING AND MAINTENANCE

BACKGROUND OF THE INVENTION

This invention relates generally to manufacturing, assembly or disassembly, and maintenance, and more particularly to apparatus and methods for the use of wearable devices in manufacturing and maintenance.

Manufacturing and maintenance processes for complex machines such as gas turbine engines often involves a series of assembly operations, which may involve putting two or more components together (literally "assembly"), as well as separating components ("disassembly"). For example, numerous components may be assembled to a machine using different types of fasteners and joints.

These kinds of assembly operations are usually not automated and are typically performed by a technician or mechanic using hand tools.

In the prior art, these kind of assembly processes typically rely on documentation such as assembly or maintenance manuals which are usually provided as printed copies or in static digital documents.

One problem with this kind of documentation is that the digital or printed documents are not in the immediate vicinity of the person performing the work, where they can easily and quickly reference them. Often the worker much climb a ladder or stand to perform the work, making it inconvenient to stop work and climb back to access the documents. Accordingly, a worker will commonly read through the instructions and then set off to accomplish the task, returning back to the instructions when necessary. This reliance on the worker's memory can lead to oversight or errors when conducting the maintenance.

Another problem with conventional assembly procedures is that confirmation that all required operations (e.g. inserting parts, tightening fasteners, etc.) for a particular procedure have been completed is done manually. This reliance on the worker's compliance with procedures can also lead to oversight or errors.

If the problem is discovered while the machine is in the possession of the manufacturer or maintainer, it can cause delays while troubleshooting and repair is performed. If a problem is not discovered until it has left the manufacturer or maintainer, it can cause considerable problems, costs, and delays to both the customer and the manufacture or maintainer.

BRIEF DESCRIPTION OF THE INVENTION

At least one of these problems is addressed by a system and method of using a wearable device to present instructions to a worker and to automatically document the completion of tasks based on signals from sensor-enabled tools.

According to one aspect of the technology described herein, and assembly system includes: a tool including a sensor; a wearable device including a display, and a computing device. The computing device is programmed to: a. provide visual instructions on the display of the wearable device; b. monitor an input from the sensor; and c. in response to the input from the sensor: i. provide feedback to the user through the display, indicating a status of an operation of the tool; and ii. store a record of the status of the operation of the tool.

According to another aspect of the technology described herein a method for assembling a machine includes: using a wearable device including a display to display instructions to a user; using a tool including a sensor to perform an assembly operation on a component which forms a part of the machine; and using a computing device: monitoring an input from the sensor; and in response to the input from the sensor: displaying feedback to the user on the display of the wearable device, indicating a status of the assembly operation; and storing a record of the status of the assembly operation.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
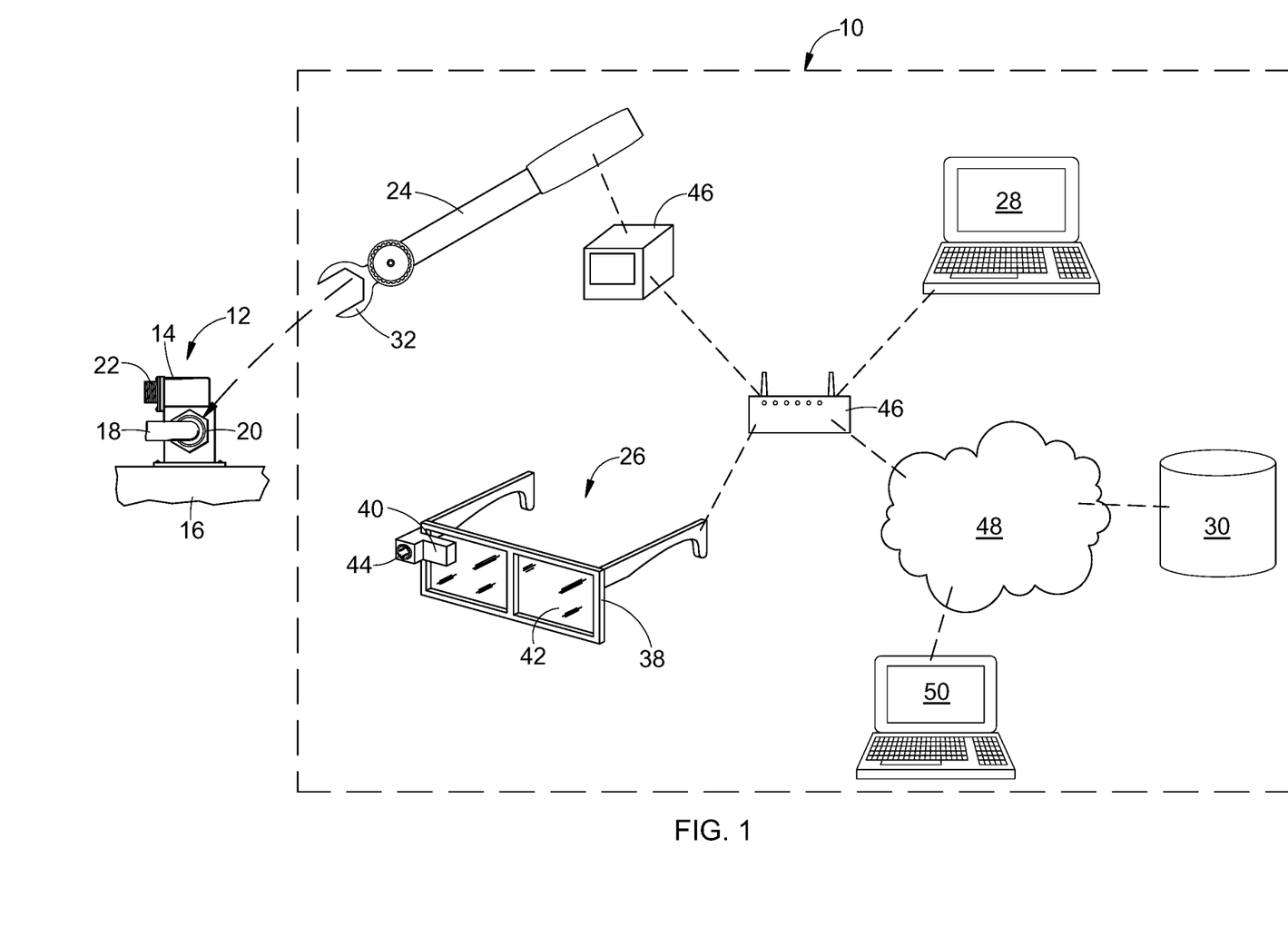
FIG. 1 is a diagrammatic view of an assembly system incorporating a wearable device.

Referring to the drawings wherein identical reference numerals denote the same elements throughout the various views, FIG. 1 illustrates schematically a wearable-integrated assembly system 10 for manufacturing, maintenance, or repair of a machine 12. As used herein the term "machine" refers broadly to any assembly of two or more components into a larger unit which performs a defined function. The term "machine" may refer to a complete device or a subassembly which is incorporated into a larger device.

In the illustrated example, the machine 12 includes a fluid pressure sensor 14 mounted to a frame 16. A fluid conduit 18 is connected to the fluid pressure sensor using a conventional threaded fitting 20, e.g. an AN818 coupling nut, conventionally referred to as a "B-nut". The fluid pressure sensor 14 further includes an electrical connector 22 for connection to a wiring harness (not shown). It will be understood that proper assembly of the machine 12 for a leak-free seal requires that the threaded fitting 20 must be threaded onto a mating part and then torqued to establish an appropriate preload. Numerous methods are available for determining an appropriate preload. One common method involves measuring the torque applied to the threaded fitting 20 by a tool such as a torque wrench, described below. It will be understood that the machine 12 is merely one example of an assembly of two or more components, and that the concepts described herein may be used for any type of assembly. Other examples include but are not limited to fluid fittings that do not have a sensor, mechanical parts connected with bolts, nuts, or other fasteners, etc.

The system 10 generally includes one or more sensor-equipped tools 24, one or more wearable devices 26, a computing device 28, and a database 30. Each of these components will be described in more detail below.

The tool 24 may be any tool which includes at least one sensor which is capable of generating a signal representative of a condition of the workpiece or the tool. Examples of parameters that may be sensed include, for example, force, pressure, torque, velocity, acceleration, orientation, and/or displacement.

Generally, use of the tool 24 in an assembly operation of a machine component causes the tool 24 to generate a signal which may then be used to determine if an operation is complete.

In the illustrated example, the tool 24 comprises a torque wrench having a set of jaws 32 sized to fit a fastener or fitting (a crow's-foot extension is shown), and also including an internal sensor such as a strain gauge (not shown) configured to measure the amount of torque applied through the jaws 32. The torque wrench further comprises a transceiver (not shown) operable to transmit a signal generated by the sensor to an outside device such as the illustrated receiver base 34. This type of torque wrench and the associated receiver base 34 are commercially available.

The wearable device 26 include includes any device which may be held or bodily worn by a human user, which includes one or more processors to execute programmed instructions and one or more output devices to communicate information and/or status to the user.

Generally, the wearable device 26 may include one or more displays configured to be located in the field of view of the human user when the device is worn. In the illustrated example, the wearable device 26 comprises a pair of "smart glasses" comprising a frame 38 which incorporate a display 40 (e.g. an LED monitor) operable to display information input to the wearable device 26. The wearable device 26 may incorporate lenses 42 which may be protective, vision corrective, or both. The wearable device 26 may also incorporate a camera 44 for taking and storing digital photographs. The wearable device 26 may optionally incorporate means for scanning informational codes, such as scanning software associated with the camera 44, a separate scanner, a near-field communications chip for communicating with RFID tags, or a similar device. The wearable device 26 may further include communications means such as a user-facing camera and/or a microphone. The wearable device 26 may further include means for accepting user instructions such as one or more switches, touch screen interfaces, a voice recognition interface, or remote interface to a separate controlling device such as a portable computing device (e.g. "smartphone") or conventional computer. Such smart glasses are commercially available. One nonlimiting example of a suitable device is the GOOGLE GLASS product.

The computing device 28 is operable to execute one or more software applications which perform functions such as receiving information from the tool 24, receiving control inputs and data from the wearable device 26, sending data to the wearable device 26, and retrieving and/or storing information from one or more databases. In the illustrated example, the computing device 28 takes the form of a conventional laptop computer, which is operably connected to the wearable device 26, the tool 24, and the database 30 through a data network using a conventional router 46 (wired or wireless). In the illustrated example, the database 30 is located in a remote location and at least some of the network comprises a wide area network 48 such as the Internet. It will be understood that some or all of the functions of the computing device 28 could be incorporated into the tool 24, into the wearable device 26, or into a remote or distributed computing environment including one or more remote computing devices 50 coupled to the system 10 through the wide area network 48. If a remote computing device 50 is used, it will be understood that data from the tool 24 and the wearable device 26 could be passed to the remote computing device 50 through the wide area network 48, and information and instructions could be passed from the remote computing device 50 back to the wearable device 26.

The system 10 may be configured to retrieve documentation from a storage location such as the database 30 and to display the documentation in a predefined format on the display 40 of the wearable device 26. The wearable device 26 would display high-level work instructions to the mechanic in a predefined format, with particular emphasis on measured values, such as torque values. The instructions could be, for example, in the form of a task list or in a series of sequential menus.

The system 10 may be configured to receive since or information from the tool 24 such as torque values. The computing device 28 may be programmed, for example, to act upon real-time torque values to trigger system functions, to store torque values for archival purposes, or a combination of both.

The system 10 may be configured to command the wearable device 26 to take one or more digital photographs based on manual or automated triggers.

The system 10 may be configured to store information from the wearable device 26 such as photographs, display information, or a combination of photographs and display information. For example, this information could be stored in the database 30.

The system 10 may be configured to retrieve supplemental information from a storage location such as the database 30 and to display the documentation in a predefined format on the display 40 of the wearable device 26. For example, supplemental information could include training or demonstration videos or animations (optionally including audio information), pictures, or schematics designed to aid the worker with performing complex tasks or learning new tasks.

The system 10 may be configured to implement two-way communication (including audio, video, or both) through the wearable device 26. For example, voice or video conferencing may be implemented between the worker and support personnel at a remote location.

An example of the use of the system 10 to perform an assembly process is as follows. This particular example involves connecting two or more components, but for the purposes of this invention, an "assembly process" may also involve disconnecting components from each other. The worker begins by accessing work instructions. For example, the wearable device 26 may be used to scan indicia such as a barcode or quick response ("QR") code printed in paper documentation or posted near the work area which provides a link to database 30 or other suitable storage location from which the computing device 28 can load a high-level version of the assembly procedures, torque values, and other reference information or visuals. As another example, the worker could manually use the controls of the wearable device 26 to access the work instructions, for example by downloading a procedure from the database 30.

Figure 2:
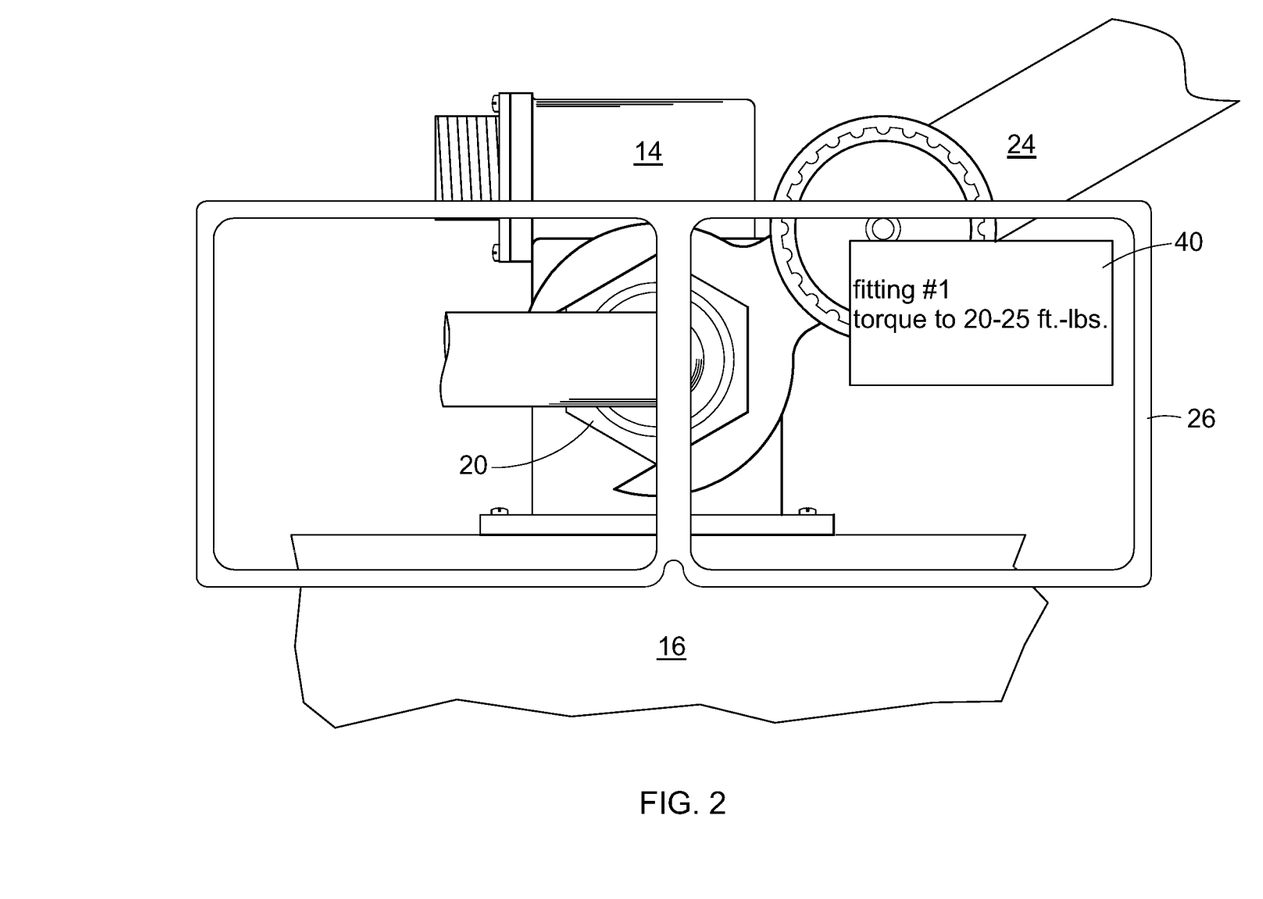
FIG. 2 is a schematic view showing a machine prior to beginning an assembly operation, showing a display of the wearable device of FIG. 1 superimposed thereupon.

The worker begins to perform the process while wearing the wearable device 26. Each individual operation is readily available while working. For example, FIG. 2 illustrates the beginning of an operation to tighten the fitting 20 described above to the pressure sensor 14 using a torque wrench, with a view through the wearable device 26 superimposed thereupon. Initially, it can be seen that the display 40 identifies the fitting and informs the worker that it must be torqued to a specific value (20 to 25 foot-pounds in this example).

If necessary, the worker can access stored videos, animations, and images as necessary for reference. Optionally, the worker can audio or video call engineers and share video to address questions or issues encountered. If necessary, the mechanic can still reference separate printed work instructions.

As the operation is carried out, the system 10 receives information from the tool 24. This information can be used to provide updated information to the worker, or to trigger automated system functions.

Figure 3:
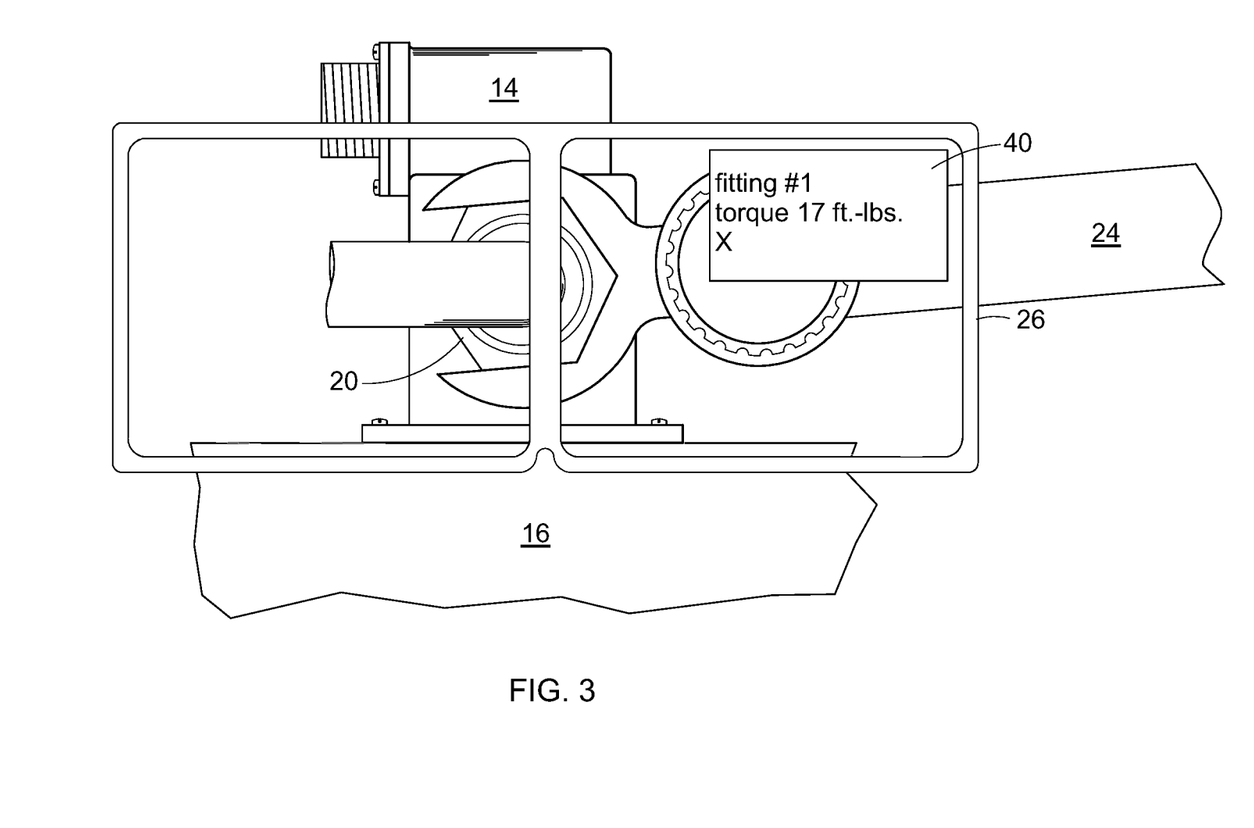
FIG. 3 is a schematic view showing the machine of FIG. 2 during the performance of the assembly operation, showing a display of the wearable device superimposed thereupon.

For example, FIG. 3 illustrates a subsequent part of the operation to tighten the fitting 20 described above, with a view through the wearable device 26 superimposed thereupon. It can be seen that the display 40 shows the instantaneous value of the applied torque, which in this case is 17 foot-pounds, a value outside of the acceptable final torque range. The system may be programmed to provide a first set of cues or indicia when the operation is incomplete. In the illustrated example, in addition to the instantaneous value of the applied torque, the display 40 shows a symbol such as an "X" character which may be displayed using a format indicating noncompliance or incompleteness. For example, the X may be displayed in a red-colored font.

Figure 4:
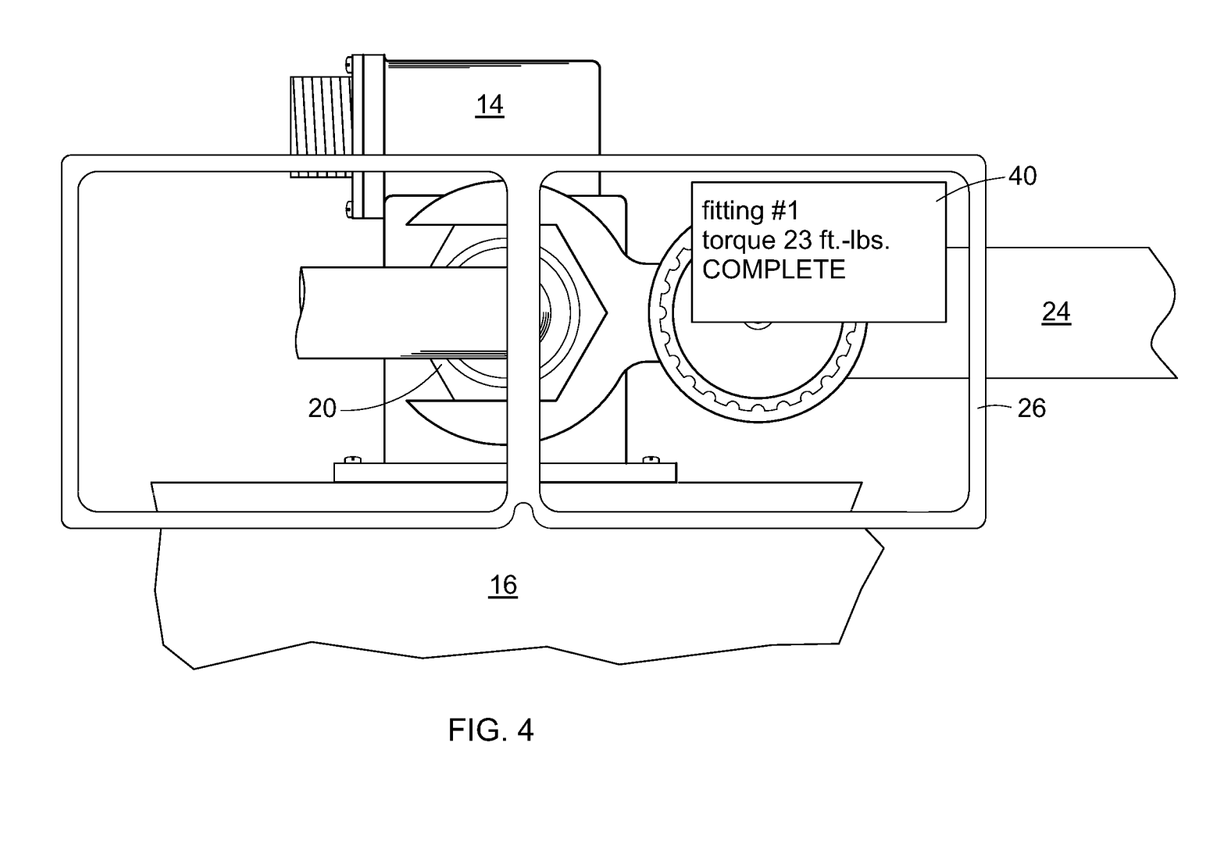
FIG. 4 is a schematic view showing the machine of FIG. 2 during completion of the assembly operation, showing a display of the wearable device superimposed thereupon.

Continuing with the above example, FIG. 4 illustrates completion of the operation to tighten the fitting 20 described above, with a view through the wearable device 26 superimposed thereupon. It can be seen that the display 40 shows the instantaneous value of the applied torque, which in this case is 23 foot-pounds, a value within the acceptable final torque range. The system may be programmed to provide a second set of cues or indicia when the operation is finished. In the illustrated example, in addition to the instantaneous value of the applied torque, the display 40 shows a symbol such as a checkmark for the word "COMPLETE" which may be displayed using a format indicating compliance or completeness. For example, the word "COMPLETE" may be displayed in a green-colored font.

In addition to providing real-time completion information to the worker, the system 10 may be configured to document the operation automatically. For example, the system 10 may be configured to automatically log sensor values generated by the tool 24, or to trigger the wearable device 26 to take and store one or more digital photographs.

Figure 5:
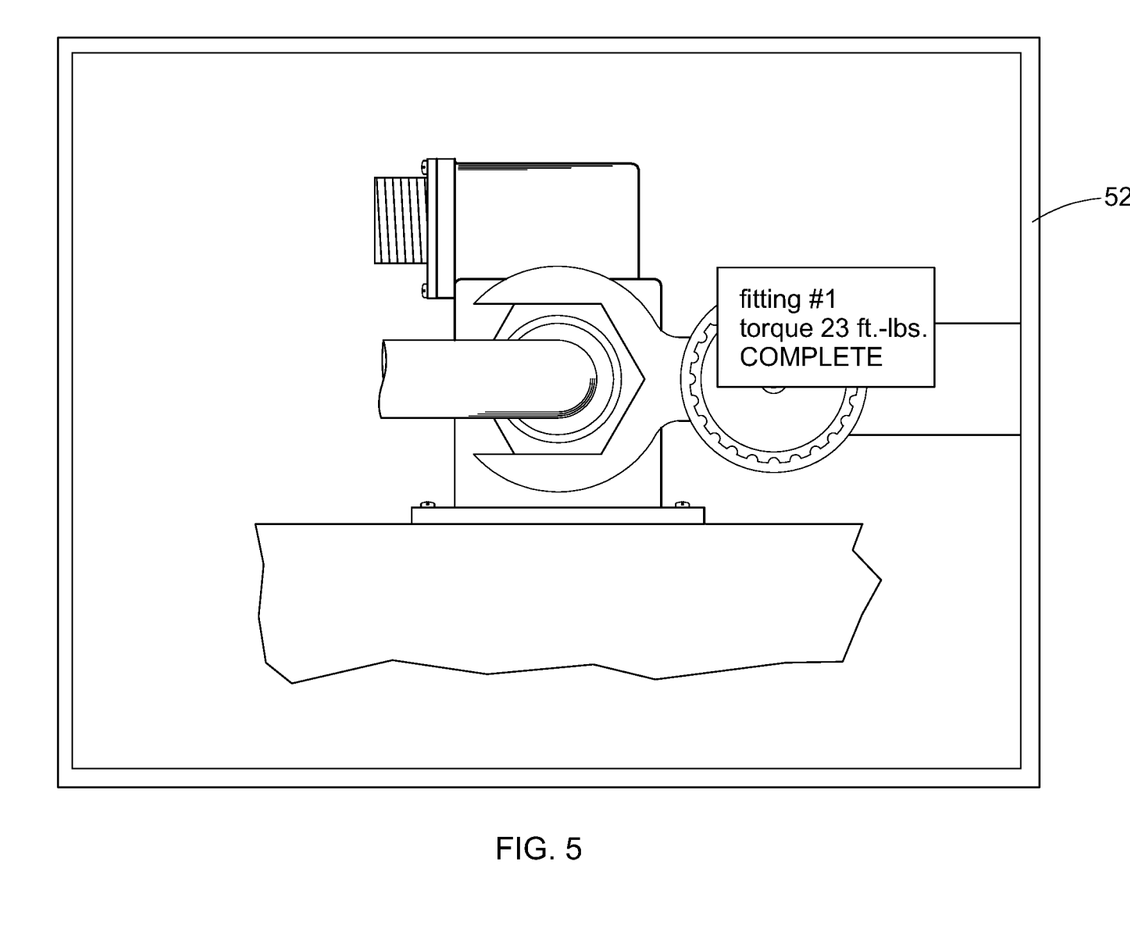
FIG. 5 is a schematic view showing a photograph taken by the wearable device of FIG. 1 upon completion of the assembly operation shown in FIGS. 2-4.

Continuing with the above example, when the system 10 detects that the torque applied by the wrench is within the acceptable range for the final torque value, the camera 44 would be triggered to take a photograph 52 showing the fully-torqued fitting 20, and the tool 24, with the information from the display 40 showing the completed operation and final torque value combined with in the image. The photograph 52 serves as a record and to document the number of items torqued.

Various methods may be used to organize the photographs 52. For example, they may be stored using unique filenames that identify the operation or component documented therein, or they may be identified and cross-referenced in a database.

While networked operation has been described, it is possible to operate the system 10 in an off-line mode. In this mode, the wearable device 26 could be provided with pre-loaded documentation. Furthermore, any sensor values or photographs 52 could be stored locally, for example using device memory, for possible later transfer to a network or other storage.

The method described herein has several advantages over the prior art. In particular, it provides instructions, documentation, and support to a worker without the worker having to leave the working space. It also provides automated documentation of process completion and avoids human error in assuring completion of all operations in an assembly process.

In addition to be used in a "production" environment for manufacture or assembly of machines that are destined for customers, the system and method described above can also be used for training. For example, a mock-up machine can be provided and a worker can practice performed the procedures using the guidance and feedback from the system as described above. This would be especially useful for workers performing a particular procedure for the first time, to avoid inevitable learning mistakes occurring on expensive components.

The foregoing has described an apparatus and method for using wearable devices in manufacturing and maintenance processes. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An assembly system, comprising:
    a tool including:
        a sensor, the sensor operable to generate a signal representative of a torque applied to a workpiece by the tool;
        a transceiver operable to transmit the signal to a receiver base;
    a wearable device separate from the tool, the wearable device including a display, a camera;
    a computing device, the computing device programmed to cause the camera to take a photograph in response to the signal from the sensor meeting a final torque range; and
    a database configured to store the photograph and supplemental information,
    wherein the wearable device is configured to transmit data to the computing device and receive data from the computing device and the tool;
    wherein the computing device is programmed to:
        a. receive control inputs and data from the wearable device;
        b. retrieve and store information in the database based on the control inputs and data received from the wearable device;
        c. provide visual instructions on the display of the wearable device based on the control inputs and data received from the wearable device;

d. monitor the signal from the sensor; and
e. in response to the signal from the sensor:
  i. provide feedback in real-time to a user of the wearable device through the display of the wearable device, indicating a real-time status of an operation of the tool, the feedback including a first display indicia indicating the torque applied is not meeting the final torque range and a second display indicia indicating the torque applied is meeting the final torque range and the operation is complete;
  ii. based on the torque applied meeting the final torque range, document the operation is complete by automatically logging sensor values generated by the tool and triggering the wearable device to take one or more digital photographs;
  iii. store logged the sensor values and the one or more digital photographs in the database; and
  iv. store a record of the status of the operation of the tool in the database.

2. The system of claim 1 wherein a data network interconnects the computing device, the wearable device, and the sensor.

3. The system of claim 1 wherein the feedback includes a current value of the torque-measured by the sensor.

4. The system of claim 1 wherein the tool comprises a torque wrench and the sensor comprises a torque sensor.

5. The system of claim 1 wherein the database is connected in communication with a data network that interconnects the computing device, the wearable device, and the sensor, and wherein the computing device is programmed to retrieve the visual instructions from the database.

6. The system of claim 1 wherein the wearable device is operable to present video information on the display.

7. The system of claim 1 where the wearable device is operable to provide two-way audiovisual communications with a remote user.

8. The system of claim 1 further comprising a data network that interconnects the computing device, the wearable device, and the sensor, wherein the data network includes a wide area network and the computing device is located remotely to the wearable device and configured to communicate with the wearable device through the wide area network.

9. A method for assembling a machine, comprising:
displaying instructions to a user on a wearable device including a display;
performing, with a tool including a sensor, an assembly operation on a component which forms a part of the assembly, the sensor operable to generate a signal representative of a torque applied by the tool;
monitoring a signal from the sensor of the tool; and
in response to the signal from the sensor,
  i. displaying feedback in real-time to a user of the wearable device on the display of the wearable device, indicating a real-time status of the assembly operation, the feedback including a first display indicia indicating the torque applied is not meeting a final torque range and a second display indicia indicating the torque applied is meeting the final torque range and the assembly operation is complete;
  ii. based on the torque applied meeting the final torque range, documenting the operation is complete by automatically logging sensor values generated by the tool and triggering a camera of the wearable device to take one or more digital photographs;
  iii. storing the logged sensor values and the one or more digital photographs in database; and
  iv. storing a record of the status of the assembly operation in the database.

10. The method of claim 9 further comprising storing, in the database, a value from the sensor indicating the status of the assembly operation.

11. The method of claim 9 wherein the tool comprises a torque wrench and the sensor comprises a torque sensor.

12. The method of claim 9 further comprising retrieving visual instructions from the database connected in communication with a computing device over a data network.

13. The method of claim 9 further comprising performing the displaying, documenting, and storing steps with a computing device located remotely to the wearable device, wherein the computing device communicates with the wearable device through a wide area network.

14. An assembly system, comprising:
a hand tool having a sensor therein, the sensor operable to generate a signal representative of a torque applied to a workpiece by the tool;
a wearable device separate from the tool and, the wearable device including a display configured to provide a user with information;
a computing device programmed to:
a. provide visual instructions on the display of the wearable device;
b. monitor the signal from the sensor; and
c. in response to the signal from the sensor:
  i. provide feedback to a user in real-time through the display of the wearable device, indicating a real-time status of whether an operation of the tool is complete or incomplete, the feedback including a first display indicia indicating the torque applied is not within a final torque range and incomplete and a second display indicia indicating the torque applied is within the final torque range and the operation is complete;
  ii. based on the torque applied meeting the final torque range, document the operation is complete by automatically logging sensor values generated by the tool and triggering the wearable device to take one or more digital photographs;
  iii. store the logged sensor values and the one or more digital photographs in a database; and
  iv. store a record of the operation of the tool.

* * * * *